United States Patent
Yang et al.

(10) Patent No.: US 8,328,887 B2
(45) Date of Patent: Dec. 11, 2012

(54) METHOD AND SYSTEM FOR PRODUCING SYNTHETIC GAS FROM BIOMASS BY HIGH TEMPERATURE GASIFICATION

(75) Inventors: Zhanchun Yang, Wuhan (CN); Haiqing Zhang, Wuhan (CN); Minxia Cao, Wuhan (CN); Anhe Chen, Wuhan (CN); Hong Li, Wuhan (CN)

(73) Assignee: Wuhan Kaidi Engineering Technology Research Institute Co., Ltd., Wuhan (CN)

( * ) Notice: Subject to any disclaimer, the term of this patent is extended or adjusted under 35 U.S.C. 154(b) by 0 days.

(21) Appl. No.: 12/782,826

(22) Filed: May 19, 2010

(65) Prior Publication Data

US 2010/0223846 A1    Sep. 9, 2010

Related U.S. Application Data

(63) Continuation of application No. PCT/CN2008/073672, filed on Dec. 24, 2008.

(30) Foreign Application Priority Data

Nov. 28, 2008    (CN) .......................... 2008 1 0236614

(51) Int. Cl.
*B01J 7/00*    (2006.01)
*C01B 3/36*    (2006.01)
*C10J 3/00*    (2006.01)
*C01B 3/24*    (2006.01)

(52) U.S. Cl. .............. 48/197 R; 48/61; 48/210; 423/650

(58) Field of Classification Search ................. 48/197 R
See application file for complete search history.

(56) References Cited

U.S. PATENT DOCUMENTS

| | | | | |
|---|---|---|---|---|
| 2,662,816 A | * | 12/1953 | Kalbach | 48/202 |
| 4,322,222 A | * | 3/1982 | Sass | 48/197 R |
| 4,334,893 A | * | 6/1982 | Lang | 48/202 |
| 4,483,199 A | * | 11/1984 | Beiermann et al. | 73/861.04 |
| 5,034,021 A | * | 7/1991 | Richardson | 48/77 |
| 5,626,638 A | * | 5/1997 | Valkanas | 48/197 R |
| 6,178,899 B1 | * | 1/2001 | Kaneko et al. | 110/346 |
| 2002/0119407 A1 | * | 8/2002 | Pisupati | 431/10 |
| 2002/0159929 A1 | * | 10/2002 | Kaneko et al. | 422/190 |
| 2002/0179493 A1 | * | 12/2002 | Etter | 208/131 |
| 2005/0132883 A1 | * | 6/2005 | Su et al. | 95/235 |
| 2005/0247553 A1 | * | 11/2005 | Ichikawa et al. | 202/96 |

* cited by examiner

*Primary Examiner* — Matthew Merkling
(74) *Attorney, Agent, or Firm* — Matthias Scholl P.C.; Matthias Scholl

(57) ABSTRACT

A method for producing synthetic gas from biomass by high temperature gasification, by: feeding biomass, carbonizing to yield pyrolysis gas and charcoal, pulverizing the charcoal, and gasifying in a gasifier. The heat source for the carbonizing step comes from a direct combustion reaction between external combustible gas and external oxygen in a carbonization furnace. Also provided is a device for producing synthetic gas from biomass by high temperature gasification, containing at least: a supercharging feeding system for biomass, a carbonization furnace containing at least a burner nozzle, a pulverizing system, a transportation system for charcoal powder, a gasifier, a pneumatic conveying system, and a plurality of connecting pipes therefor; the burner nozzle of the carbonization furnace is connected to an external combustible gas pipe and an external oxygen pipe respectively.

15 Claims, 1 Drawing Sheet

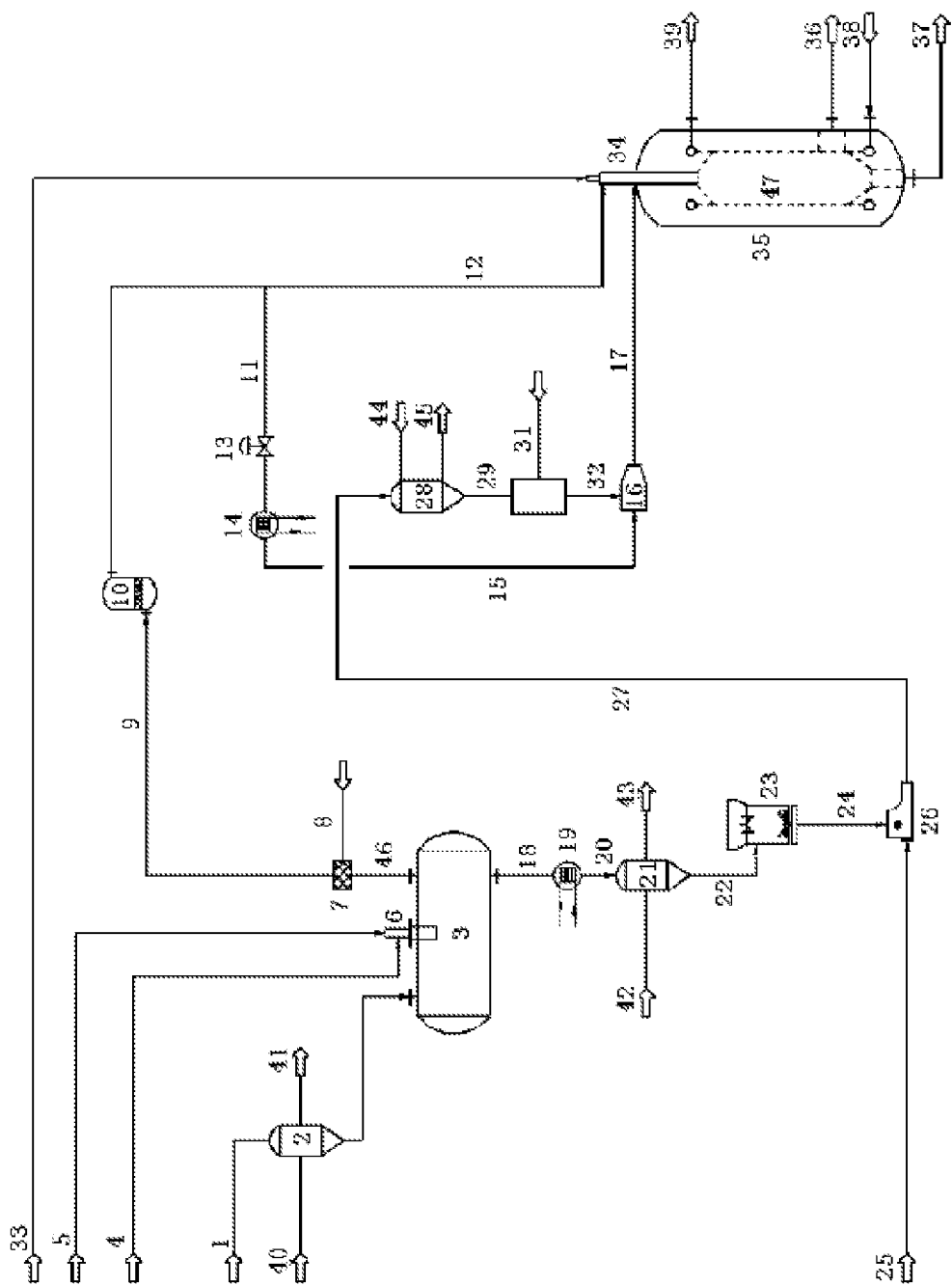

METHOD AND SYSTEM FOR PRODUCING SYNTHETIC GAS FROM BIOMASS BY HIGH TEMPERATURE GASIFICATION

CROSS-REFERENCE TO RELATED APPLICATIONS

This application is a continuation of International Patent Application No. PCT/CN2008/073672 with an international filing date of Dec. 24, 2008, designating the United States, now pending, and further claims priority benefits to Chinese Patent Application No. 200810236614.4 filed Nov. 28, 2008. The contents of all of the aforementioned applications, including any intervening amendments thereto, are incorporated herein by reference.

BACKGROUND OF THE INVENTION

1. Field of the Invention

The invention relates to the production of synthetic gas, and more particularly to a method and a system for producing synthetic gas from biomass by high temperature gasification.

2. Description of the Related Art

Biomass, an organic matter generated by plants through photosynthesis, has wide sources and large available quantity. It can be transformed into clean gas or liquid fuel for power generation and producing industrial raw materials and chemical products. As energy it is clean and renewable with zero emission of carbon dioxide.

There are many methods for transforming biomass into clean gas or liquid fuel, among which biomass gasification technology can adapt to a variety of species and has good expansibility. The gasification of biomass is a thermochemical process, i.e., biomass reacts with a gasification agent (such as air, oxygen, vapor, carbon dioxide, etc.) under high temperature to produce a mixed gas consisting of carbohydrate containing carbon, hydrogen, and oxygen. The mixed gas is named synthetic gas. The components of the synthetic gas are decided by the species of used biomass, the type of the gasification agent, the reaction conditions, and the structure of a gasifier used therein. The objectives of gasification is, on the one hand, to minimize the consumption of materials and the gasification agent, as well as the tar content in the synthesis gas, and on the other hand, to maximize the gasification efficiency and the efficiency of carbon conversion, as well as the active ingredient (CO and $H_2$) content in the synthesis gas. The objectives are decided by the type of the used gasifier, the type of the gasification agent, the particle size of the biomass, the gasification pressure and temperature, and moisture and ash of the biomass, etc.

Conventional gasifier is in the form of a fixed bed, a fluidized bed, or an entrained flow bed. The fixed bed has a simple structure and flexible operating mode, and is easy for practice. Solid materials have a long retaining time in the bed, the efficiency of carbon conversion is high, the operating load is wide (changeable between 20 and 110%). However, the temperature in the fixed bed is nonuniform, the heat exchange effect is poor, the synthetic gas has a low heating value, and a large amount of tar is produced.

The fluidized bed is convenient for material addition and ash release, and the temperature is uniform and easy for adjustment. However, it is sensitive to the characteristics of raw materials. If the adhesion, thermal stability, moisture content, or ash melting point of raw materials changes, the operation will become abnormal. Furthermore, the synthetic gas has a large amount of tar. Since a large amount of tar is produced in the fixed bed and the fluidized bed, a tar cracking unit and purification equipment must be installed, which results in a complicated process.

The entrained flow bed has a high and uniform operating temperature, good amplification characteristics, and particularly suitable for large-scale industrialization. Tar is cracked completely. However, the entrained flow bed has a strict requirement on particle size of raw materials. Based on current grinding technology, there is no way to grind biomass having much cellulose to a size suitable for the entrained flow bed. So the entrained flow bed cannot be used for gasification of biomass. Nowadays, tar cracking and pretreatment of biomass prior to gasification are tough problems for the development of biomass gasification.

Chinese Patent Application No. 200510043836.0 discloses a method and a device for gasifying low tar biomass. The method includes pyrolysis and gasification independently, and biomass is transformed into synthetic gas containing low content of tar. In the method, pyrolysis gas and charcoal experience incomplete combustion in the gasifier at around 1000° C., and tar is cracked under high temperature. Although the tar content is decreased greatly, a lot of charcoal is consumed, resulting in a low content of CO produced in the subsequent reduction reaction and a high content of $CO_2$ in the synthetic gas. Secondly, due to a low temperature in the combustion reaction, the average temperature in the reduction zone is less than 700° C., and thereby the yield of effective synthetic gas (CO and $H_2$) is decreased significantly (about 30%). Thirdly, the ash and unreacted carbon residue from the reduction reaction is directly discharged, resulting in a low carbon conversion rate. Finally, the gasifier used in the method is in the form of a fixed bed, since the reduction reaction absorbs heat, the temperature difference between the top and the bottom (the top is about 1000° C. and the bottom is about 500° C.) of the bed is huge, which is an inherent disadvantage of fixed bed.

U.S. Pat. No. 6,863,878B2 discloses a method and a device of producing synthetic gas with carbon-containing materials. The method includes carbonization (or pyrolysis) and gasification independently. In the method, the carbonization temperature is controlled less than 450° F. as so to reduce the tar content resulted from pyrolysis. However, during carbonization stage, solid products are not ground prior to transporting to the reaction coils of the gasifier, which will affect the speed and degree of gasification reaction. Secondly, since the gasification reaction happens in the reaction coil, a large amount of transport gas is needed, but the transport gas will take away a lot of heat during transporting, and thereby the gasification efficiency is low, the temperature is nonuniform, and the subsequent waste heat recovery system is massive. Thirdly, it is not economic that newly-produced synthetic gas is used to provide heat for gasification and carbonization. Fourthly, combustion products (mainly $CO_2$ and $H_2O$) are directly discharged and not fully utilized, resulting in low gasification efficiency. Finally, the ash and unreacted carbon residue in the synthetic gas are also discharged directly, resulting in low carbon conversion rate.

Chinese Patent Application No. 200610124638.1 discloses a method of producing synthetic gas from biomass by combined cycle high temperature gasification. The method includes carbonization and high temperature gasification. However, in the method, heating by the gasifier or cycled synthetic gas has hidden danger, the heating rate of pyrolysis is very slow, material consumption is high, and thereby the total gasification efficiency is low. Secondly, the charcoal powder transportation system (two-stage ejecting) is complicated, for high temperature gasification system, the synthetic gas for charcoal powder transportation is something like inert gas, so more oxygen and effective synthetic gas are consumed, and the gasification efficiency will be decreased by about between 5 and 10%. Furthermore, high pressure of charcoal from the carbonization furnace is directly transported into a high pressure milling machine after cooling without decompression, which is very difficult to achieve in industry.

From the above mentioned methods, conventional gasification, whether from biomass or from solid carbon-containing materials, cannot produce synthetic gas with high efficiency and low cost. Although the technology of independent pyrolysis and gasification can adapt to a variety of biomass and reduce the content of tar in synthetic gas, shortcomings such as nonuniform temperature, large investment in equipment for waste heat recovery, high material consumption, low gasification efficiency, and low carbon conversion rate limit the application of biomass gasification in industry. Particularly, there is no effective method for gasifying biomass applied to an entrained flow bed.

SUMMARY OF THE INVENTION

In view of the above-described problems, it is one objective of the invention to provide a method for producing synthetic gas from biomass by high temperature gasification that has high efficiency and low cost.

It is another objective of the invention to provide a system for producing a system for producing synthetic gas from biomass by high temperature gasification that has high efficiency and low cost.

To achieve the above objectives, in accordance with one embodiment of the invention, there is provided a method for producing synthetic gas from biomass by high temperature gasification that has high efficiency and low cost, the method comprising feeding biomass, carbonizing to yield pyrolysis gas and charcoal, pulverizing the charcoal, and gasifying in a gasifier, wherein a heat source for the carbonizing is achieved by a direct combustion reaction between external combustible gas and external oxygen in a carbonization furnace.

In a class of this embodiment, a temperature in the carbonization furnace is controlled at between 400 and 600° C. by adjusting the input amount of oxygen; suppose the molar consumption of the combustible gas is 1 in a complete combustion between the combustible gas and oxygen, the input amount of the combustible gas is adjusted to more than 1 and less than 5 mole so as to control a temperature of a burner nozzle of the carbonization furnace at between 1200° C. and 1800° C.

In a class of this embodiment, a temperature in the carbonization furnace is controlled at between 450 and 550° C. by adjusting the input amount of oxygen; suppose the molar consumption of the combustible gas is 1 in a complete combustion between the combustible gas and oxygen, the input amount of the combustible gas is between 1.5 and 3 moles.

In a class of this embodiment, prior to pulverizing, the charcoal is reduced to a normal pressure by a decompression feeding device of charcoal, pulverized into powders, and transported to a supercharging feeding system of charcoal powder by normal pressure transport gas.

In a class of this embodiment, the pyrolysis gas from the carbonization furnace as the transport gas transports the charcoal powder to the gasifier, and a solid-gas ratio is controlled between 0.03 and 0.45 $m^3/m^3$ by adjusting the input amount of the pyrolysis gas.

In a class of this embodiment, the method further comprises fluidizing during the transportation of the charcoal powder, a fluidizing gas being the external combustible gas.

In a class of this embodiment, an outlet of the pyrolysis gas is disposed on the top of the carbonization furnace and connected to the gasifier, a filter is disposed at the outlet of the pyrolysis gas, and a purge gas of the filter is the external combustible gas.

In accordance with another embodiment of the invention, there is provided a system for producing synthetic gas from biomass by high temperature gasification that has high efficiency and low cost, the system comprising a supercharging feeding system of biomass, a carbonization furnace having a burner nozzle, a pulverizing system, a transportation system of charcoal powder, a gasifier, a pneumatic conveying system, and a plurality of connecting pipes thereof, wherein the burner nozzle of the carbonization furnace is connected to an external combustible gas pipe and an external oxygen pipe respectively.

In a class of this embodiment, from a charcoal outlet of the carbonization furnace to the gasifier, a charcoal cooler, a decompression feeding system of charcoal, a pulverizer, and a supercharging feeding system of charcoal powder are disposed sequentially.

In a class of this embodiment, an outlet of the pyrolysis gas is disposed on the top of the carbonization furnace and connected to the gasifier, a filter is disposed at the outlet of pyrolysis gas, and a purge gas of the filter is an external combustible gas.

Advantages of the invention are summarized below:

1. The carbonization furnace is heated by a direct combustion between external combustible gas and external oxygen. The external combustible gas is natural gas or exhaust gas containing hydrocarbon produced by other systems. By direct combustion, the heating effect of the carbonization furnace is very good so that the carbonization process can be achieved quickly. However, in Chinese Patent Application No. 200610124638.1 which discloses a method of producing synthetic gas from biomass by combined cycle high temperature gasification, the combustible gas (i.e., synthetic gas) providing heat for the carbonization furnace is produced by the system itself, and only the sensible heat of the combustible gas is utilized, the heating mode is indirect heat exchange. Therefore, the heating efficiency is low, the process is complicated, the heating rate of raw materials is slow, and the carbonization a slow pyrolysis process.

In the invention, external combustible gas and external oxygen are used, and by adjusting the proportion thereof, the temperature of the carbonization furnace, the temperature of the burner nozzle of the carbonization furnace, and the heating rate can be controlled effectively. The invention has achieved the following objectives: a) to provide heat for the carbonization of biomass by a direct combustion between the external combustible gas and oxygen; b) if the external combustible gas is excess, the excess part can be used as inert gas to absorb heat so as to reduce the temperature of the burner nozzle of the carbonization furnace; however, if real inert gas having no hydrocarbon is introduced to reduce the temperature of the burner nozzle of the carbonization furnace, a large amount of inert gas will enter the gasification system, which means the working efficiency of the system and the quality of the synthetic gas will decrease significantly; c) since the combustible gas is excess, only part of combustible gas is consumed, the excess gas will be consumed in the gasifier, which improves the efficiency of energy utilization.

Therefore, the introduction of external combustible gas can improve the gasification efficiency, reduce the oxygen consumption of the synthetic gas, and enhance the energy conversion rate of the system. Compared with the method for producing synthetic gas by combined cycle gasification mentioned above, in the invention, the gasification efficiency has been increased by more than 1%, and the oxygen consumption (the consumed oxygen (mole) for producing 1 mole of CO and $H_2$) is reduced to less than 0.3 mol/mol.

2. In conventional dry coal gasification, inert gas ($CO_2$ or $N_2$) is used as transport gas. The introduction of inert gas results in low gasification efficiency and high oxygen consumption. In the invention, the charcoal powder is transported by pyrolysis gas, the oxygen consumption is decreased by between 10% and 20%, and the gasification efficiency is increased by between 5% and 10%.

3. That the combustible gas fluidizes charcoal powder can avoid the blocking during transporting charcoal powder, avoid introduction of inert gas which will result in low quality of synthetic gas and low gasification efficiency, and also avoid the condensation of the pyrolysis gas resulted from the entrance of pyrolysis gas into the supercharging feeding system of charcoal powder.

4. That the external combustible gas is used as purge gas of the filter can avoid the introduction of inert gas and improve the quality of the synthetic gas.

5. Conventional supercharging pulverization is feasible theoretically, but there are many technical difficulties for practice, such as high pressure sealing and safety. In the invention, the decompression feeding of charcoal and pulverization at normal pressure is safe and easy for practice.

BRIEF DESCRIPTION OF THE DRAWINGS

The invention is described hereinbelow with reference to accompanying drawings, in which:

FIG. 1 is a schematic diagram of a system and process for producing synthetic gas from biomass by high temperature gasification according to one embodiment of the invention.

DETAILED DESCRIPTION OF THE EMBODIMENTS

For further illustrating the invention, experiments detailing a method and a system for producing synthetic gas from biomass by high temperature gasification are described below. It should be noted that the following examples are intended to describe and not to limit the invention.

As shown in FIG. 1, a system for producing synthetic gas from biomass by high temperature gasification comprises: 1. an inlet of biomass; 2. a supercharging feeding system of biomass; 3. a carbonization furnace; 4. a combustible gas pipe connected to a burner nozzle of the carbonization furnace; 5. an oxygen pipe connected to the burner nozzle of the carbonization furnace; 6. a burner nozzle of the carbonization furnace; 7. a filter; 8. a combustible gas (functioning as purge gas) pipe connected to the filter; 9. a pyrolysis gas pipe connected to an outlet of the filter; 10. a buffer tank; 11. a pyrolysis gas pipe for transporting charcoal powder; 12. a pyrolysis gas pipe connected to a burner nozzle of a gasifier; 13. a control valve; 14. a heater; 15. a transport pipe of heated pyrolysis gas; 16. an ejector of charcoal powder; 17. a transport pipe of a mixture of charcoal powder and pyrolysis gas; 18. an outlet pipe of charcoal; 19. a charcoal cooler; 20. a transport pipe of cooled charcoal; 21. a decompression feeding system of charcoal; 22. a normal pressure charcoal pipe; 23. a pulverizer; 24. a charcoal powder pipe; 25. a normal pressure transport gas pipe; 26. a normal pressure pneumatic conveying system; 27. a transport pipe of a mixture of normal pressure transport gas and charcoal powder; 28. a supercharging feeding system of charcoal powder; 29. a high pressure charcoal powder pipe; 30. a fluidizing device; 31. a fluidizing gas pipe; 32. a transport pipe of fluidized charcoal powder; 33. an oxygen pipe connected to a burner nozzle of a gasifier; 34. a burner nozzle of a gasifier; 35. a gasifier; 36. a synthetic gas outlet; 37. an ash pipe; 38. a transport pipe of deoxygenated and desalted water; 39. a saturated vapor pipe; 40. a gas-charging pipe of the supercharging feeding system of biomass; 41. a gas-discharging pipe of the supercharging feeding system of biomass; 42. a gas-charging pipe of the decompression feeding system of charcoal; 43. a gas-discharging pipe of the decompression feeding system of charcoal; 44. a gas-charging pipe of the supercharging feeding system of charcoal powder; 45. a gas-discharging pipe of the supercharging feeding system of charcoal powder; 46. a pyrolysis gas pipe connected to an outlet of the carbonization furnace; and 47. a water wall.

The burner nozzle 6 of the carbonization furnace 3 is connected to the combustible gas pipe 4 and the oxygen pipe 5 respectively. Along the pipes connecting the charcoal outlet of the carbonization furnace 3 with the gasifier 35, the charcoal cooler 19, the decompression feeding system of charcoal 21, the pulverizer 23, and the supercharging feeding system of charcoal powder 28 are disposed sequentially. The ejector of charcoal powder 16 transports the charcoal powder, and connects with the transport pipe of heated pyrolysis gas 15 and the transport pipe of fluidized charcoal power 32. On the top of the carbonization furnace 3 there disposed an outlet of pyrolysis gas which is connected to the gasifier 35. The filter 7 is disposed at the outlet of pyrolysis gas. An inlet of purge gas of the filter 7 is connected to the combustible gas pipe 8.

Dried biomass is put into the supercharging feeding system of biomass 2 via the inlet of biomass 1, and then transported to the carbonization furnace 3 by pneumatic booster technology. To the carbonization furnace 3, external combustible gas from the combustible gas pipe 4 and external oxygen from the oxygen pipe 5 are separately charged. A combustion reaction between the combustible gas and oxygen provides heat for pyrolysis of biomass. The temperature of the carbonization furnace 3 is controlled between 400 and 600° C. by adjusting the input amount of external oxygen. By adjusting the input amount of the external combustible gas at between 1 and 5 times that required for a complete combustion with oxygen, the temperature of the burner nozzle 6 of the carbonization furnace 3 can be controlled less than 1800° C. The products of the carbonization furnace 3 are pyrolysis gas comprising CO, $H_2$, $CO_2$, $H_2O$, and $CH_4$ and charcoal. The crude pyrolysis gas enters the filter 7 via the pyrolysis gas pipe 46 and is filtered, and solid particles containing carbon return to the carbonization furnace 3 via the pyrolysis gas pipe 46. The purified pyrolysis gas enters the buffer tank 10 via the pyrolysis gas pipe 9 connected to an outlet of the filter 7.

Part of purified pyrolysis gas from the buffer tank 10 enters the heater 14 via the pyrolysis gas pipe transporting charcoal powder 11 and the control valve 13. The pyrolysis gas transporting charcoal powder is heated to between 550 and 650° C. and enters the ejector of charcoal powder 16 via the transport pipe of heated pyrolysis gas 15. The solid-gas ratio in the transport pipe of a mixture of charcoal powder and pyrolysis gas 17 is controlled between 0.03 and 0.45 $m^3/m^3$ by adjusting the opening of the control valve 13.

The other part of purified pyrolysis gas from the buffer tank 10 via the pyrolysis gas pipe 12 connected to the burner nozzle 34 of the gasifier 35 and oxygen via the oxygen pipe 33 connected to the burner nozzle 34 of the gasifier 35 enter the burner nozzle 34 of the gasifier 35. The fluidized charcoal powder and heated pyrolysis gas are also transported by the transport pipe of a mixture of charcoal powder and pyrolysis gas 17 into the burner nozzle 34 of the gasifier 35. High temperature gasification reaction happens in the gasifier 35. By adjusting the input amount of the external oxygen and the heat exchange of the water wall 47 having deoxygenated and desalted water, the temperature of the synthetic gas outlet 36 is controlled between 1200 and 1600° C. The gasification products mainly comprise CO, $H_2$, a small amount of $CO_2$ and $H_2O$, and little $CH_4$. The deoxygenated and desalted water in the water wall 47 absorbs heat and transforms into sub-high pressure saturated water vapor which is discharged into the saturated vapor pipe 39. Ash produced during gasification is discharged into the ash pipe 37.

The charcoal produced in the carbonization furnace 3 is cooled by the charcoal cooler 19 to a working temperature of the decompression feeding system of charcoal 21, decompressed therein, pulverized by the pulverizer 23, and transferred to the normal pressure pneumatic conveying system 26 via the charcoal powder pipe 24. The normal pressure transport gas ($CO_2$ or $N_2$) pipe 25 transports the charcoal powder to the supercharging feeding system of charcoal powder 28. By pneumatic booster technology, the pressure of the charcoal powder is enhanced by the supercharging feeding system of charcoal powder 28 to a working pressure of the gasifier 35. The high pressure charcoal powder enters the fluidizing device 30 via the high pressure charcoal powder pipe 29, and is fluidized by external combustible gas from the fluidizing gas pipe 31. The fluidized charcoal powder enters the ejector of charcoal powder 16 and subsequently transported into the gasifier 35.

Example 1

Take wood as a raw material of biomass. The elemental composition and characteristic data of the dried wood are listed in Table 1.

TABLE 1

Elemental composition and characteristic data of the dried wood

| Items | Symbol | Unit | Value |
| --- | --- | --- | --- |
| Carbon | $C_{ar}$ | %(Kg/Kg) | 39.43 |
| Hydrogen | $H_{ar}$ | %(Kg/Kg) | 5.21 |
| Oxygen | $O_{ar}$ | %(Kg/Kg) | 38.36 |
| Nitrogen | $N_{ar}$ | %(Kg/Kg) | 0.15 |
| Sulfur | $S_{ar}$ | %(Kg/Kg) | 0.21 |
| Chlorine | $Cl_{ar}$ | %(Kg/Kg) | 0.00 |
| Ash | $A_{ar}$ | %(Kg/Kg) | 5.00 |
| Moisture | $M_{ar}$ | %(Kg/Kg) | 11.64 |
| Ash fusion point | FT | ° C. | 1436 |
| Low heat value | LHV | MJ/Kg | 14.75 |

Take natural gas as external combustible gas. The elemental composition and characteristic data of the external combustible gas are listed in Table 2.

TABLE 2

Components and characteristic data of natural gas

| Components | Value |
| --- | --- |
| $CH_4$ | 91.746% |
| $C_2H_6$ | 4.480% |
| $C_3H_8$ | 2.257% |
| $CO_2$ | 0.070% |
| $O_2$ | 0.040% |
| $N_2$ | 1.406% |
| $H_2S$ concentration (mg/$Nm^3$) | 20.00 |
| Low heat value (kcal/$m^3$) | 9000.8 |

The main operating conditions are set as follows:

1) The transportation amount of biomass into the carbonization furnace 3 via the supercharging feeding system of biomass 2 is 4.07 kg/s.

2) The pressure of the carbonization furnace 3 is 3.1 Mpa, and the temperature is 500° C.

3) The input amount of the external combustible gas (mole) is 2 times that required for a complete combustion with the input oxygen.

4) The heating rate of pyrolysis of the biomass in the carbonization furnace 3 is 50° C./s.

5) The charcoal is cooled by the charcoal cooler 19 to 80° C.

6) The pyrolysis gas is heated by the heater 14 to 600° C.

7) The solid-gas ratio in the transport pipe of a mixture of charcoal powder and pyrolysis gas 17 is 0.03 $m^3/m^3$.

8) The pressure of the gasifier 35 is 3.0 Mpa, and temperature is 1300° C.

Based on the above conditions, the main flow rate and performance parameters of the system are as follows:

1) The mass flow rate of the external combustible gas (40° C.) entering the carbonization furnace 3 is 0.28 Kg/s.

2) The mass flow rate of the external oxygen (160° C.) entering the carbonization furnace 3 is 0.63 Kg/s.

3) The flame temperature of the burner nozzle 6 of the carbonization furnace 3 is 1800° C.

4) The total weight of the pyrolysis gas produced in the carbonization furnace 3 is 3.69 Kg/s.

5) The total weight of the charcoal produced in the carbonization furnace 3 is 1.19 Kg/s.

6) The combustible gas which is transported by the fluidizing gas pipe 31 and used for fluidizing the charcoal powder has a temperature of 300° C. and a mass flow rate of 0.03 Kg/s.

7) The mass flow rate of the pyrolysis gas used for transporting charcoal powder in the pyrolysis gas pipe 11 is 0.89 Kg/s.

8) The mass flow rate of the mixed gas in the transport pipe of a mixture of charcoal powder and pyrolysis gas 17 is 2.1 Kg/s.

9) The mass flow rate of the pyrolysis gas in the pyrolysis gas pipe 12 connected to the burner nozzle 34 of the gasifier 35 is 2.8 Kg/s.

10) The external oxygen transported into the gasifier 35 by the oxygen pipe 33 connected to the burner nozzle 34 of the gasifier 35 has a temperature of 160° C. and a mass flow rate of 1.5 Kg/s.

11) The total weight of the synthetic gas from the synthetic gas outlet 36 is 6.5 Kg/s, and the dry basis of CO and $H_2$ is 87.2%.

12) The carbon conversion rate of the system is 99.9%, and oxygen consumption of effective synthetic gas is 0.3 mol/mol.

Example 2

Take wood as a raw material of biomass (as shown in Table 1). Take natural gas as external combustible gas (as shown in Table 2). The temperature of the carbonization furnace 3 is 600° C. The heating rate of pyrolysis of the biomass in the carbonization furnace 3 is 100° C./s. Other operating conditions are the same as that in Example 1.

Based on the above conditions, the main flow rate and performance parameters of the system are as follows:

1) The mass flow rate of the external combustible gas (40° C.) entering the carbonization furnace 3 is 0.33 Kg/s.

2) The mass flow rate of the external oxygen (160° C.) entering the carbonization furnace 3 is 0.63 Kg/s.

3) The flame temperature of the burner nozzle 6 of the carbonization furnace 3 is 1700° C.

4) The total weight of the pyrolysis gas produced in the carbonization furnace 3 is 3.84 Kg/s.

5) The total weight of the charcoal produced in the carbonization furnace 3 is 1.19 Kg/s.

6) The combustible gas which is transported by the fluidizing gas pipe 31 and used for fluidizing the charcoal powder has a temperature of 300° C. and a mass flow rate of 0.03 Kg/s.

7) The mass flow rate of the pyrolysis gas used for transporting charcoal powder in the pyrolysis gas pipe 11 is 0.89 Kg/s.

8) The mass flow rate of the mixed gas in the transport pipe of a mixture of charcoal powder and pyrolysis gas 17 is 2.1 Kg/s.

9) The mass flow rate of the pyrolysis gas in the pyrolysis gas pipe 12 connected to the burner nozzle 34 of the gasifier 35 is 2.96 Kg/s.

10) The oxygen transported into the gasifier 35 by the oxygen pipe 33 connected to the burner nozzle 34 of the gasifier 35 has a temperature of 160° C. and a mass flow rate of 1.5 Kg/s.

11) The total weight of the synthetic gas from the synthetic gas outlet 36 is 6.6 Kg/s, and the dry basis of CO and $H_2$ is 87.5%.

12) The carbon conversion rate of the system is 99.9%, and oxygen consumption of effective synthetic gas is 0.308 mol/mol.

Example 3

Take wood as a raw material of biomass (as shown in Table 1). Take natural gas as the external combustible gas (as shown in Table 2). The input amount of the external combustible gas (mole) is 5 times that required for a complete combustion with the input oxygen. Other operating conditions are the same as that in Example 1.

Based on the above conditions, the main flow rate and performance parameters of the system are as follows:

1) The mass flow rate of the external combustible gas (40° C.) entering the carbonization furnace 3 is 0.78 Kg/s.

2) The mass flow rate of the external oxygen (160° C.) entering the carbonization furnace 3 is 0.604 Kg/s.

3) The flame temperature of the burner nozzle 6 of the carbonization furnace 3 is 1200° C.

4) The total weight of the pyrolysis gas produced in the carbonization furnace 3 is 4.3 Kg/s.

5) The total weight of the charcoal produced in the carbonization furnace 3 is 1.19 Kg/s.

6) The combustible gas which is transported by the fluidizing gas pipe 31 and used for fluidizing the charcoal powder has a temperature of 300° C. and a mass flow rate of 0.02 Kg/s.

7) The mass flow rate of the pyrolysis gas used for transporting charcoal powder in the pyrolysis gas pipe 11 is 0.89 Kg/s.

8) The mass flow rate of the mixed gas in the transport pipe of a mixture of charcoal powder and pyrolysis gas 17 is 2.1 Kg/s.

9) The mass flow rate of the pyrolysis gas in the pyrolysis gas pipe 12 connected to the burner nozzle 34 of the gasifier 35 is 3.4 Kg/s.

10) The external oxygen transported into the gasifier 35 by the oxygen pipe 33 connected to the burner nozzle 34 of the gasifier 35 has a temperature of 160° C. and a mass flow rate of 2.05 Kg/s.

11) The total weight of the synthetic gas from the synthetic gas outlet 36 is 7.6 Kg/s, and the dry basis of CO and $H_2$ is 90.4%.

12) The carbon conversion rate of the system is 99.9%, and oxygen consumption of effective synthetic gas is 0.295 mol/mol.

Example 4

Take wood as a raw material of biomass (as shown in Table 1). Take natural gas as external combustible gas (as shown in Table 2). The temperature of the carbonization furnace 3 is 400° C. The charcoal is cooled by the charcoal cooler 19 to 200° C. Other operating conditions are the same as that in Example 1.

Based on the above conditions, the main flow rate and performance parameters of the system are as follows:

1) The mass flow rate of the external combustible gas (40° C.) entering the carbonization furnace 3 is 0.23 Kg/s.

2) The mass flow rate of the external oxygen (160° C.) entering the carbonization furnace 3 is 0.44 Kg/s.

3) The flame temperature of the burner nozzle 6 of the carbonization furnace 3 is 1800° C.

4) The total weight of the pyrolysis gas produced in the carbonization furnace 3 is 3.55 Kg/s.

5) The total weight of the charcoal produced in the carbonization furnace 3 is 1.19 Kg/s.

6) The combustible gas which is transported by the fluidizing gas pipe 31 and used for fluidizing the charcoal powder has a temperature of 300° C. and a mass flow rate of 0.03 Kg/s.

7) The mass flow rate of the pyrolysis gas used for transporting charcoal powder in the pyrolysis gas pipe 11 is 0.833 Kg/s.

8) The mass flow rate of the mixed gas in the transport pipe of a mixture of charcoal powder and pyrolysis gas 17 is 2.04 Kg/s.

9) The mass flow rate of the pyrolysis gas in the pyrolysis gas pipe 12 connected to the burner nozzle 34 of the gasifier 35 is 2.72 Kg/s.

10) The oxygen transported into the gasifier 35 by the oxygen pipe 33 connected to the burner nozzle 34 of the gasifier 35 has a temperature of 160° C. and a mass flow rate of 1.5 Kg/s.

11) The total weight of the synthetic gas from the synthetic gas outlet 36 is 6.3 Kg/s, and the dry basis of CO and $H_2$ is 87.1%.

12) The carbon conversion rate of the system is 99.9%, and oxygen consumption of effective synthetic gas is 0.3 mol/mol.

Example 5

Take wood as a raw material of biomass (as shown in Table 1). Take natural gas as the external combustible gas (as shown in Table 2). The temperature of the pyrolysis gas is heated by the heater 14 to 650° C. The solid-gas ratio in the transport pipe of a mixture of charcoal powder and pyrolysis gas 17 is 0.45 $m^3/m^3$. Other operating conditions are the same as that in Example 1.

Based on the above conditions, the main flow rate and performance parameters of the system are as follows:

1) The mass flow rate of the pyrolysis gas used for transporting charcoal powder in the pyrolysis gas pipe 11 is 0.63 Kg/s.

2) The mass flow rate of the mixed gas in the transport pipe of a mixture of charcoal powder and pyrolysis gas 17 is 1.8 Kg/s.

3) The mass flow rate of the pyrolysis gas in the pyrolysis gas pipe 12 connected to the burner nozzle 34 of the gasifier 35 is 3.1 Kg/s.

4) The oxygen transported into the gasifier 35 by the oxygen pipe 33 connected to the burner nozzle 34 of the gasifier 35 has a temperature of 160° C. and a mass flow rate of 1.5 Kg/s.

5) The total weight of the synthetic gas from the synthetic gas outlet 36 is 6.5 Kg/s, and the dry basis of CO and $H_2$ is 87.2%.

6) The carbon conversion rate of the system is 99.9%, and oxygen consumption of effective synthetic gas is 0.3 mol/mol.

Results Analysis

1. The Effect of Temperature of Carbonization Furnace on the Results

When the carbonization temperature is less than 400° C., the produced pyrolysis gas contains too much tar, which may result in the condensation of the pyrolysis gas and affect the transportation of charcoal powder. When the carbonization temperature is more than 600° C., ordinary alloy steel materials cannot bear such high temperature, but specific alloy material will increase the cost of the carbonization furnace.

2. The Effect of Input Amount of External Combustible Gas on the Results

If the input amount of the external combustible gas (mole) is equal to that required for a complete combustion with the input oxygen, a complete reaction between the combustible gas and the input oxygen happens, and the flame temperature of the burner nozzle of the carbonization furnace will be more than 2000° C. Working for a long time at such a high temperature will destroy the internal mechanical components of the carbonization furnace, and even lead to safety accident. With the increasing charging of the external combustible gas, the flame temperature of the burner nozzle of the carbonization furnace will decrease. When the input amount of the external combustible gas (mole) is 5 times that required for a complete combustion with the input oxygen, the flame temperature of the burner nozzle of the carbonization furnace will decrease to 1200° C. If the input amount of the external combustible gas is further increased, the flame temperature of the burner nozzle of the carbonization furnace will decrease accordingly, which increases the gas velocity of the outlet of the burner nozzle and leads to unstable combustion. Furthermore, increased gas velocity of the outlet of the burner nozzle of the carbonization furnace will lead to the sharp increase of $CH_4$ content at the outlet of the gasifier. In order to reduce the content of $CH_4$, the gasification temperature needs enhancing, which will lead to a high investment cost on the gasifier.

3. The Effect of Solid-Gas Ratio in the Transport Pipe of a Mixture of Charcoal Powder and Pyrolysis Gas on the Results When the solid-gas ratio is less than 0.03 $m^3/m^3$, the pyrolysis gas for transporting charcoal powder accounts for a large proportion, and the pyrolysis gas reacting with oxygen in the gasifier accounts for a small proportion, which will affect the stable operation of the burner nozzle of the gasifier. When the solid-gas ratio is more than 0.45 $m^3/m^3$, the charcoal powder may subside or block during transportation, which will lead to the fluctuation of charcoal powder amount and affect the stable operation of the burner nozzle of the gasifier.

4. The Effect of the Outlet Temperature of the Charcoal Cooler on the Results

When the charcoal temperature at the outlet of the charcoal cooler is less than 60° C., the area and volume for heat exchange of the cooler must be large, which means a high cost. Furthermore, the lower the charcoal temperature, the lower the system efficiency. When the charcoal temperature at the outlet of the charcoal cooler is more than 200° C., some devices of the decompression feeding system of charcoal may not run smoothly.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for producing synthetic gas from biomass by high temperature gasification, comprising feeding biomass to a carbonization furnace, providing external combustible gas and external oxygen to said carbonization furnace, carbonizing said biomass to yield pyrolysis gas and charcoal by conducting a direct combustion reaction between said external combustible gas and said external oxygen, pulverizing said charcoal, and gasifying in a gasifier, wherein a heat source for said carbonizing is achieved by the direct combustion reaction between said external combustible gas and said external oxygen in said carbonization furnace; and an input amount of said external combustible as is controlled at between 1.5 and 3 times that required for a complete combustion with said external oxygen.

2. The method of claim 1, wherein a temperature in said carbonization furnace is controlled at between 400 and 600° C. by adjusting the input amount of said external oxygen.

3. The method of claim 1, wherein the temperature in said carbonization furnace is controlled at between 450 and 550° C. by adjusting the input amount of said external oxygen.

4. The method of claim 1, wherein prior to pulverizing, said charcoal is reduced to a normal pressure by a decompression feeding device of charcoal, pulverized into powders, and transported to a supercharging feeding system of charcoal powder by normal pressure transport gas.

5. The method of claim 1, wherein said pyrolysis gas as the transport gas transports the charcoal powder to said gasifier, and a solid-gas ratio is controlled between 0.03 and 0.45 $m^3/m^3$ by adjusting the input amount of the pyrolysis gas.

6. The method of claim 1, further comprises fluidizing during the transportation of said charcoal powder, a fluidizing gas being said external combustible gas.

7. The method of claim 1, wherein an outlet of said pyrolysis gas is disposed on the top of said carbonization furnace and connected to said gasifier, a filter is disposed at the outlet of said pyrolysis gas, and a purge gas of said filter is said external combustible gas.

8. A method for producing synthetic gas from biomass by high temperature gasification, comprising feeding biomass in a carbonization furnace, providing external combustible gas and external oxygen in said carbonization furnace, carbonizing said biomass to yield pyrolysis gas and charcoal by conducting direct combustion reaction between said external combustible gas and said external oxygen, pulverizing said charcoal, and gasifying in a gasifier, wherein a heat source for said carbonizing is achieved by the direct combustion reaction between said external combustible gas and said external oxygen in said carbonization furnace; and a temperature in said carbonization furnace is controlled at between 450 and 550° C. by adjusting the input amount of said external oxygen.

9. The method of claim 8, wherein a temperature of a burner nozzle of said carbonization furnace is controlled at between 1200° C. and 1800° C. by adjusting the input amount of said external combustible gas at between more than 1 and less than 5 times that required for a complete combustion with said external oxygen.

10. The method of claim 9, wherein the input amount of said external combustible gas at between 1.5 and 3 times that required for a complete combustion with said external oxygen.

11. The method of claim 8, wherein prior to pulverizing, said charcoal is reduced to a normal pressure by a decompression feeding device of charcoal, pulverized into powders, and transported to a supercharging feeding system of charcoal powder by a transport gas at normal pressure.

12. The method of claim 8, wherein said pyrolysis gas as the transport gas transports the charcoal powder to said gasifier, and a solid-gas ratio is controlled between 0.03 and 0.45 m$^3$/m$^3$ by adjusting the input amount of the pyrolysis gas.

13. The method of claim 8, further comprises fluidizing during the transportation of said charcoal powder, a fluidizing gas being said external combustible gas.

14. The method of claim 8, wherein an outlet of said pyrolysis gas is disposed on the top of said carbonization furnace and connected to said gasifier, a filter is disposed at the outlet of said pyrolysis gas, and a purge gas of said filter is said external combustible gas.

15. A method for producing synthetic gas from biomass by high temperature gasification, comprising feeding biomass in a carbonization furnace, providing external combustible gas and external oxygen in said carbonization furnace, carbonizing said biomass to yield pyrolysis gas and charcoal by conducting direct combustion reaction between said external combustible gas and said external oxygen, pulverizing said charcoal, and gasifying in a gasifier, wherein a heat source for said carbonizing is achieved by the direct combustion reaction between said external combustible gas and said external oxygen in said carbonization furnace; an input amount of said external combustible gas is controlled at between 1.5 and 3 times that required for a complete combustion with said external oxygen; and a temperature in said carbonization furnace is controlled at between 450 and 550° C. by adjusting the input amount of said external oxygen.

* * * * *